US006983644B2

(12) United States Patent
Yamanaka et al.

(10) Patent No.: US 6,983,644 B2
(45) Date of Patent: Jan. 10, 2006

(54) SPECIMEN OBSERVATION METHOD IN ATOMIC FORCE MICROSCOPY AND ATOMIC FORCE MICROSCOPE

(75) Inventors: Kazushi Yamanaka, Miyagi (JP); Keiichi Nakamoto, Tokyo (JP)

(73) Assignee: JEOL Ltd., Tokyo (JP)

( * ) Notice: Subject to any disclaimer, the term of this patent is extended or adjusted under 35 U.S.C. 154(b) by 0 days.

(21) Appl. No.: 10/103,524

(22) Filed: Mar. 21, 2002

(65) Prior Publication Data

US 2002/0166368 A1    Nov. 14, 2002

(30) Foreign Application Priority Data

Mar. 22, 2001   (JP)   ............................. 2001-081805

(51) Int. Cl.
*G01B 5/28*   (2006.01)
(52) U.S. Cl. ..................................................... 73/105
(58) Field of Classification Search .................. 73/105; 331/116 M
See application file for complete search history.

(56) References Cited

U.S. PATENT DOCUMENTS

| | | | | |
|---|---|---|---|---|
| 5,412,980 A | * | 5/1995 | Elings et al. ................... 73/105 |
| 5,966,053 A | * | 10/1999 | Durig et al. ............. 331/116 M |
| 6,006,593 A | * | 12/1999 | Yamanaka ..................... 73/105 |
| 6,008,489 A | * | 12/1999 | Elings et al. ................... 73/105 |
| 6,311,549 B1 | * | 11/2001 | Thundat et al. ............. 73/54.24 |
| 6,365,895 B1 | * | 4/2002 | Yamamoto .................... 73/105 |
| 6,489,776 B1 | * | 12/2002 | Stowe et al. ................. 324/458 |
| 2002/0092340 A1 | * | 7/2002 | Prater et al. ............... 73/24.02 |

OTHER PUBLICATIONS

Kolosov et al. "Imaging the Elastic Nanostructure of Ge Islands by Ultrasonic Force Microscopy", Aug. 3, 1998, Physical Review Letters, vol. 81, No. 5, pp. 1046-1049.*
Yamanaka et al. "Resonance Frequency and Q Factor Mapping by Ultrasonic Atomic Force Microscopy", Applied Physics Letters, vol. 78, No. 13, pp. 1939-1941.*
Horowitz, Paul and Hill, Winfield The Art of Electronics, 2nd Edition, 1995 no month, Cambridge University Press, p. 297.*
"Ultrasonic Atomic Force Microscope With Overtone Excitation of Cantilever", Kazushi Yamanaka and Shizuka Nakano, *Jpn. J. Appl. Phys.*, vol. 35 (1996), pp. 3787-3792, Part 1, No. 6B, Jun. 1996.
"Vibrational dynamics of force microscopy: Effect of tip dimensions", Oliver B. Wright and Norihiko Nishiguchi, *Appl. Phys. Lett.*, vol. 71 (5), Aug. 4, 1997, pp. 626-628.
"Quantitative elasticity evaluation by contact resonance in an atomic force microscope", K. Yamanaka and S. Nakano, *Appl. Phys. A*, vol. 66, pp. S313-S317, May 4, 1998.

* cited by examiner

*Primary Examiner*—Michael Cygan
(74) *Attorney, Agent, or Firm*—The Webb Law Firm

(57) ABSTRACT

A method and apparatus for observing a specimen in atomic force microscopy with a vibrating cantilever maintained in resonance while a probe attached to the cantilever is maintained in contact with the specimen. The Q factor of the cantilever is determined based upon the detected amplitude.

13 Claims, 2 Drawing Sheets

GRAPH OF PRINCIPLE OF MEASUREMENT

SPECIMEN OBSERVATION METHOD IN ATOMIC FORCE MICROSCOPY AND ATOMIC FORCE MICROSCOPE

BACKGROUND OF THE INVENTION

1. Field of the Invention

The present invention relates to a method that is used to observe a specimen in atomic force microscopy (AFM) and adapted for evaluation of physical properties of a specimen. The invention also relates to an atomic force microscope implementing this method.

2. Description of Related Art

Ultrasonic atomic force microscopy has been developed as a technique for evaluating the contact elasticity of the portion of a specimen surface contacted with a probe, from the resonance frequency of the flexural vibration of the cantilever of an atomic force microscope (AFM) operating in contact mode (K. Yamanaka and S. Nakano, *Jpn. J Appl. Phys.*, Vol. 35 (1996), pages 3787–3792). This method has the feature that it can evaluate the contact elasticity of a stiff sample using a softer cantilever than is used in the presently commercially available contact elasticity evaluation technique of force modulation mode. This method is adapted for evaluation of metals, ceramics, semiconductors, and so on. Furthermore, the energy dissipation characteristics of a contact portion can be evaluated from the Q factor that is defined as the ratio of the resonance frequency to the resonant peak width (O. B. Wright and N. Nishiguchi, *Appl. Phys. Lett.*, Vol. 71 (1997) pages 626–628). In addition, a method of evaluating elastic characteristics more completely by separating Young's modulus, shear modulus, and Poisson ratio by the use of torsional vibration of a cantilever has been proposed (K. Yamanaka and S. Nakano, *Appl Phys. A.*, Vol. 66, (1998), pages S313–S317).

This ultrasonic atomic force microscopy is similar to recently widespread, frequency modulation mode, non-contact atomic force microscopy (NC-AFM) in that resonance of a cantilever is used. However, they have essential differences. In particular, in non-contact AFM, the cantilever vibrates at large amplitude of more than 10 nm and the probe moves away from the specimen. On the other hand, in ultrasonic AFM, the cantilever vibrates at a small amplitude of less than 1 nm, and the probe is kept in contact with the specimen. As a result, either the force gradient that is the ratio of displacement to force or contact elasticity is kept substantially constant over one period of vibration. The vibration can be analyzed by applying the linear elastic theory. Accurate quantitative evaluation is permitted. This is contrasted with non-contact AFM, which needs analysis of non-linear vibrations. Sometimes, complex chaotic behaviors participate in non-contact AFM. The ultrasonic AFM has the unique feature that structures and defects under the surface can be analyzed, as well as surface structures, because a strong contact force acts between the probe and the specimen. Therefore, this is expected as a new lattice defect analysis method that compensates for the drawbacks with electronic and mechanical material evaluation techniques in nanotechnology, as well as the drawbacks with electron microscopy. In practice, in international meetings about scanning probe microscopes and ultrasonic measurement related techniques, sessions on ultrasonic atomic force microscopes have been held since 1998. It is expected that ultrasonic AFM will spread considerably rapidly mainly to the field of materials.

Where the resonance frequency and the Q factor are measured by ultrasonic AFM, it is necessary that the frequency be swept and that a resonance spectrum be measured. Where resonance spectra are measured, if 10 spectra are time-averaged, it takes about 5 seconds to measure one spectrum even if a high-speed network analyzer is used. Therefore, visualization owing to mapping of resonance frequencies and Q factors takes a long time. Where an image of 256 pixels×256 pixels is created, 91 hours are necessary. The Q factor is an index indicating energy dissipation from a specimen surface, and includes information independent of resonance frequencies indicative of elastic characteristics. It is forecasted that material information will exist which cannot be discovered until resonance frequency and Q factor are both measured and compared. Consequently, there is a strong demand for a technique capable of measuring the distribution of Q factors and the distribution of resonance frequencies in a practical time and visualizing the distributions.

SUMMARY OF THE INVENTION

It is an object of the present invention to provide a method of observing a specimen in atomic force microscopy while meeting the requirement described above. It is another object of the present invention to provide an atomic force microscope implementing this method.

A method of observing a specimen in atomic force microscopy in accordance with the present invention starts with vibrating a cantilever to maintain it in resonance while a probe attached to the cantilever is kept in contact with a specimen. The amplitude of the cantilever in resonance is detected. The Q factor of the cantilever is found based on the detected amplitude.

An atomic force microscope according to the present invention is capable of measuring the Q factor of the cantilever. When the Q factor is measured, a switch is closed. Under the initial condition of resonance, a probe is in contact with a specimen. The cantilever is in resonance. The output from an error amplifier is null. When the specimen is started to be scanned, the resonance frequency of the cantilever varies according to the physical properties of the specimen portion contacting the probe. The phase of the output signal from a low-pass filter is varied. Consequently, the output voltage from a phase comparator varies. This produces an inverted output voltage from the error amplifier. This output voltage is added to a preset voltage and applied to a voltage-controlled oscillator. The cantilever is vibrated at its resonance frequency at all times. Under this condition, the amplitude of the cantilever is detected by an amplitude detector. Image creation means converts the amplitude of the cantilever into the Q factor, using a previously found calibration curve or sensitivity coefficient.

Other objects and features of the invention will appear in the course of the description thereof, which follows.

DESCRIPTION OF THE PREFERRED EMBODIMENTS

The amplitude of vibration of a cantilever is in proportion to the Q factor when the vibration is in resonance. It is the object of the present invention to provide a Q factor-measuring method and a method of visualizing the distribution of the Q factor. These methods are characterized in that the Q factor is calculated from the amplitude of the vibration using a calibration curve prepared separately after measuring the amplitude of the vibration in resonance. No frequency sweeping is necessary here to measure the Q factor in atomic fore microscopy, unlike the prior art method. Consequently, the measurement is performed quickly. Concomitantly, the resonance frequency can be measured. Detail analysis of material characteristics is enabled by simultaneous measurement of resonance frequency and Q factor.

The effectiveness of the principle of the present invention is next theoretically demonstrated. It is known that where the waveform of vibration of a cantilever excited by its holding portion is expressed in a gradient form, we have $$V(x) = \frac{\partial z(x)}{\partial x} \quad (1)$$

$$= \left(\frac{u_0}{2}\right)\frac{b}{L}e^{i\omega x}\left\{\sinh b\frac{x}{L} - \sin b\frac{x}{L} - \beta(\varpi)\left(\sin b\frac{x}{L} + \sinh b\frac{x}{L}\right) + D(\varpi)\left(\cos b\frac{x}{L}x - \cosh b\frac{x}{L}\right)\right\}$$

where $$B\left(\varpi = \frac{SS_h + a(CS_h + SC_h)}{(1 + CC_h) + a(CS_h - SC_h)}, D(\varpi) = \frac{CS_h + SC_h + 2aCC_h}{(1 + CC_h) + a(CS_h - SC_h)}\right)$$

where z is the displacement of the cantilever, $u_0$ is the amplitude of the holding portion, ω is the angular frequency, L is the length of the cantilever, S=sin b, $S_h$=sinh b, C=cos b, $C_h$= cosh b, $$a = -\frac{1}{b^3}\left\{\frac{3s}{k} + i\sqrt{3}\,\Gamma b^2\right\}, b = 3^{1/4}\sqrt{\Omega},$$

where the variable $$\Omega = \frac{\omega}{\sqrt{\frac{k}{M}}}$$

is a dimensionless normalized frequency and $$\Gamma = \frac{\gamma}{\sqrt{Mk}}$$

is a dimensionless normalized attenuation coefficient. Note that M is the mass of the cantilever, k is the spring constant of the cantilever, s is the contact stiffness between the probe and the specimen, and γ is the attenuation coefficient between the probe and the specimen. The value of Eq. (1) is proportional to a signal obtained by a laser deflection type AFM. Eq. (1) is made more accurate by taking account of the lateral stiffness of the probe and specimen, the tilt of the cantilever, and the profile of the probe.

Figure 1:
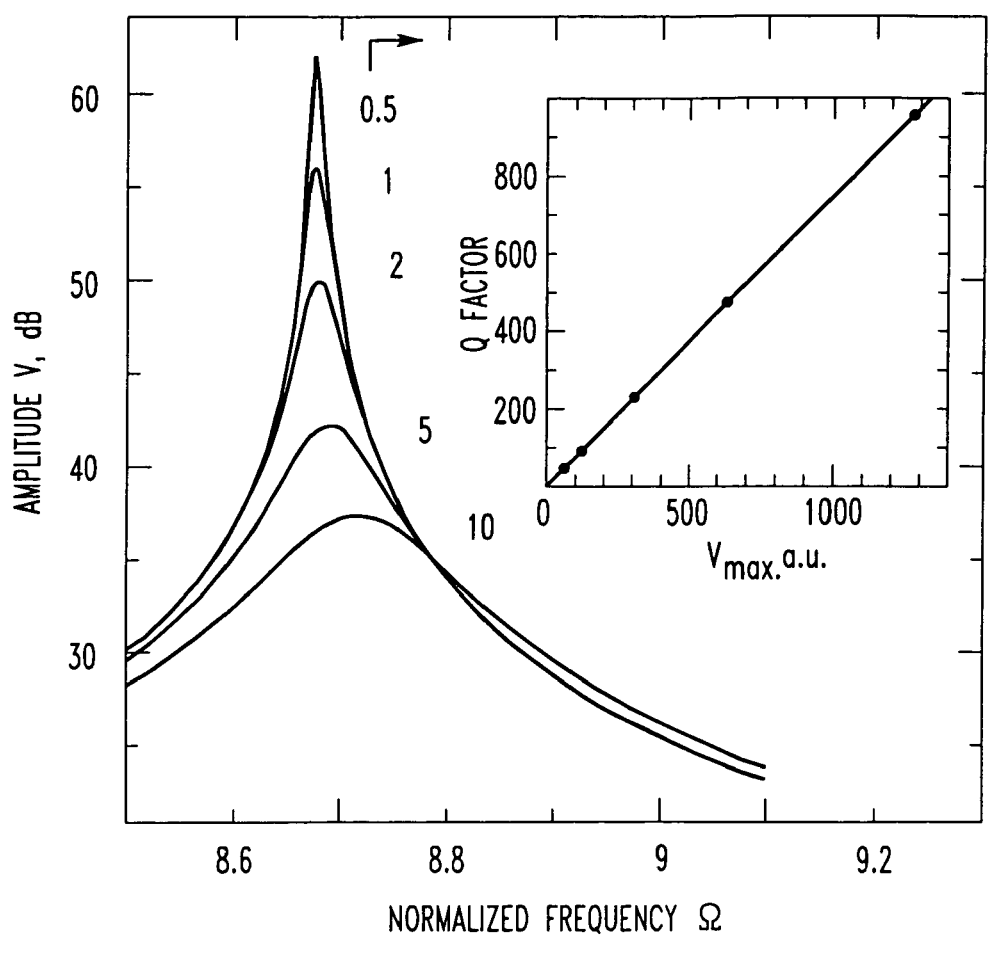
FIG. 1 is a graph illustrating the principle of the present invention.

A first-order resonance spectrum was calculated under the conditions $$\frac{s}{k} = 200,$$

$$\Gamma \equiv \frac{\gamma}{\sqrt{Mk}} = 0.5, 1, 2, 5,$$

and 10, and x=L, using Eq. (1). The calculated spectrum is shown in FIG. 1, which illustrates the principle of measurement. This corresponds to a case in which laser light is made to hit the end of the cantilever. The Q factor indicating the sharpness of resonance is calculated as the ratio of half value width to peak frequency. The inset of FIG. 1 is obtained by plotting the Q factor against peak height Vmax under resonant condition. The graph of the inset shows a linear proportional relation between them.

The degree to which this linearity holds is evaluated by numerical calculation. Where the normalized attenuation coefficient Γ was varied from 0.1 to 10, the ratio Q/Vmax, or the ratio of Q factor to maximum peak height Vmax, was kept almost constant (0.413 to 0.422). Where the value of s/k was greater than 200, the ratio Q/Vmax varied more mildly. Thus, it is obvious that the peak height in resonance can be used as an index of the Q factor.

An example of an atomic force microscope for visualizing resonance frequency and Q factor according to the principle described above is shown in FIG. 2. This microscope is made up of a cantilever 1, an optical system, and a specimen stage 4 capable of controlling the z position of a specimen. The optical system includes a laser diode (LD) 2 and a photodiode (PD) 3. Light from the laser diode 2 is directed to the cantilever 1. Light reflected from the cantilever 1 is detected by the photodiode 3. The output signal from the photodiode 3 indicates deflection of the cantilever 1. A computing portion 5 produces a cantilever signal proportional to the tilt angle due to the deflection of the cantilever 1. The cantilever signal is split into two portions, one of which is supplied to a low-pass filter (LPF) 6. A z-position controller 7 controls the z position of the specimen in response to the output signal from the low-pass filter 6. The structure described thus far is the same as a normal contact mode AFM.

Figure 2:
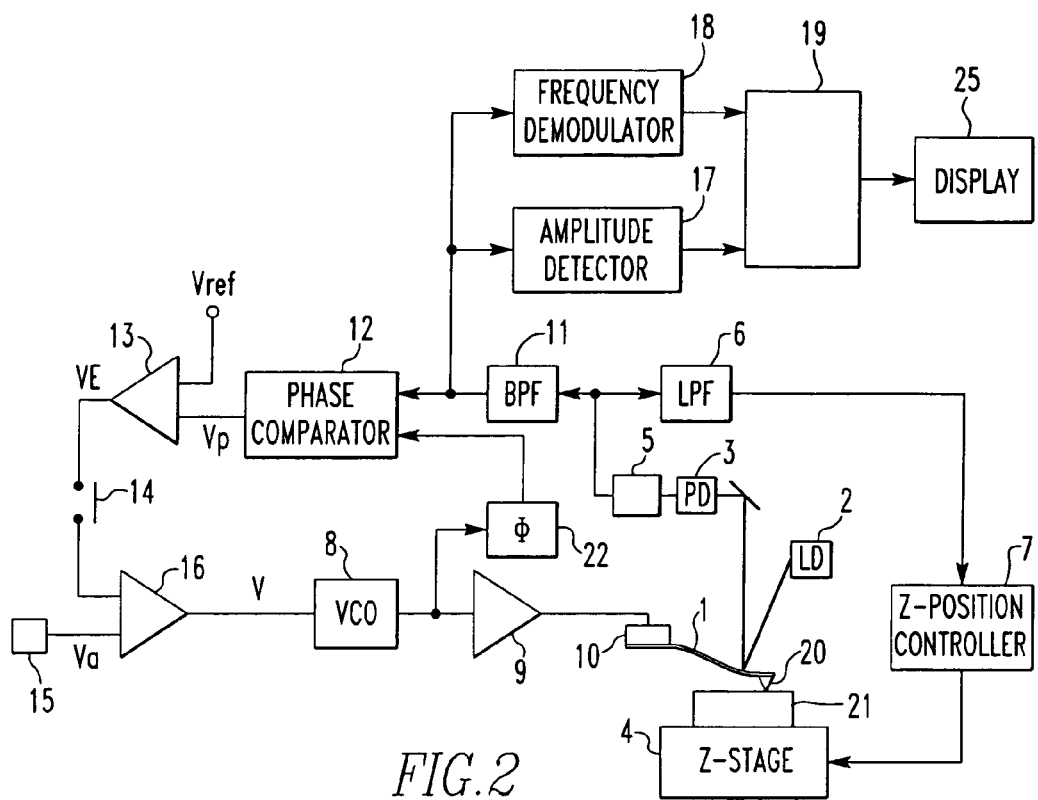
FIG. 2 is a block diagram of an atomic force microscope in accordance with the present invention.

The instrument of FIG. 2 according to the present invention further includes a voltage-controlled oscillator (VCO) 8 and an amplifier 9 as components of an ultrasonic atomic force microscope. The oscillator 8 produces an AC Signal that is amplified by the amplifier 9. The output from the amplifier 9 is fed to an ultrasonic vibrator 10 in the cantilever holding portion.

The other portion of the cantilever signal is supplied to the signal input terminal of a phase comparator 12 via a band-pass filter (BPF) 11. The output signal from the voltage-controlled oscillator 8 is also split into two parts ahead of the amplifier 9 and fed to the reference signal input terminal of the phase comparator 12 via a variable phase shifter 22. The output signal Vp from the phase comparator 12 is applied to an error amplifier 13, together with a reference voltage signal Vref that can be previously set using a control program. The error amplifier 13 produces an output signal $V_E$ proportional to the difference in two input signals. The output signal $V_E$ is applied to the input side of an adder 16 via a switch 14. A voltage supply circuit 15 produces a constant voltage $V_0$ that can be specified using a control program. This voltage $V_0$ is applied to another input terminal of the adder 16. The output V from the adder 16 is applied to the input terminal of the voltage-controlled oscillator 8 via an amplifier (not shown).

The output signal from the band-pass filter 11 is fed to an amplitude detector 17 and to a frequency demodulator 18. The output signal from the amplitude detector 17 and the output signal from the frequency demodulator 18 are fed to an image creation means 19.

Referring also to FIG. 2, a probe 20 is attached to the front end of the cantilever 1. A specimen 21 is placed on the specimen stage 4 in an opposite relation to the probe 20.

In FIG. 2, vibrating means according to the present invention is made up of the voltage-controlled oscillator 8, amplifier 9, ultrasonic vibrator 10, voltage supply circuit 15, and adder 16. Vibration control means according to the present invention is composed of the phase comparator 12, variable phase shifter 22, error amplifier 13, and switch 14.

A programmable filter having a steep cutoff characteristic of 48 dB/Oct can be attached to the outside of the band-pass filter 11 and used.

The instrument shown in FIG. 2 and built in accordance with the present invention operates in the manner described below.

Operation as Atomic Force Microscope:

First, the operator adjusts the position of the laser diode (LD) 2 and the position of the photodiode (PD) 3 while the specimen 21 is away from the probe 20 to obtain a cantilever signal indicative of the deflection of the cantilever 1 at an optimum sensitivity, in the same way as when a normal contact mode AFM is used. Then, the z-position controller 7 is operated to lift the specimen stage 4, thus bringing the specimen 21 into contact with the probe 20. This varies the cantilever signal and thus varies the output signal from the low-pass filter (LPF) 6. The loop for controlling the z position of the specimen 21 is operated to maintain the output signal from the low-pass filter 6 at a preset given value.

Operation as Ultrasonic Atomic Force Microscope Devised According to the Present Invention:

(a) Realization of Linear Spectrum Owing to Inspection of Symmetry of Resonance Spectrum When the feedback control switch 14 for the voltage-controlled oscillator 8 is open, the oscillator 8 is operated to excite the cantilever 1 into flexural vibration. The input voltage $V_0$ determining the oscillation frequency of the voltage-controlled oscillator 8 is swept, and a resonance spectrum of the cantilever 1 is measured from the output from the band-pass filter 11. At this time, if the gain of the voltage-controlled oscillator 8 acting as an amplifier is too high (i.e., if the output lever from the VCO 8 is too high), the cantilever amplitude will become excessively large. The probe 20 will intermittently come out of contact with the specimen 21. As a result, the symmetry of the spectrum will be spoiled. Accordingly, the gain of the amplifier 9 is so adjusted that the spectrum is symmetrical with respect to the resonance frequency and that a sufficiently good signal-to-noise ratio is obtained. In consequence, the cantilever 1 vibrates while the probe 20 is kept in contact with the specimen 21, and a linear resonance spectrum is obtained.

(b) Measurement of Sensitivity Coefficient

The peak frequency and half value width of the linear resonance spectrum are measured, and the Q factor is calculated. The height Vmax of the resonance peak obtained at this time is recorded. Then, various combinations of different values of the Q factor and height Vmax are accomplished by varying the load or the position of the probe 20 on the specimen 21 or by other methods. This process is repeated several times. As a result, a calibration curve indicating the relation between the Q factor and the peak height Vmax quantitatively is created as shown in FIG. 1. It is desirable to obtain calibration curves for each value of relative contact stiffness s/k, because the slope of calibration curve is dependent on the magnitude of s/k.

Since linearity holds between the Q factor and the peak height Vmax, if the sensitivity coefficient Q/Vmax is found from the results of one set of measurements, then approximate results will be obtained.

Information about the calibration curve and sensitivity coefficient Q/Vmax found in this way is stored in the image creation means 19 (i.e., printer, CRT).

(c) Setting of Initial State of Resonance

Then, the set voltage $V_0$ is adjusted such that the oscillation frequency of the voltage-controlled oscillator 8 agrees with the resonance frequency generated when the probe 20 touches the specimen 21 and that the amplitude of the cantilever signal becomes greatest. The adjusted value is maintained. Under this condition, the variable phase shifter 22 is adjusted so that the output Vp from the phase comparator 12 agrees with the reference voltage Vref. The amount of phase shift $\Phi$ introduced by the voltage-controlled oscillator 8 is adjusted to set the output signal $V_E$ from the error amplifier 13 at zero.

(d) Scanning and Image Formation

After making the setting described above, the feedback control switch 14 for the voltage-controlled oscillator 8 is closed to activate the control loop for tracking the resonance frequency. Note that the oscillation frequency of the voltage-controlled oscillator 8 does not vary at this time because the output signal from the error amplifier 13 is zero. The specimen stage 4 is scanned in the x- and y-directions in two dimensions to start to scan the specimen 21. The probe 20 scans across the specimen surface whose physical properties vary from location to location. The resonance frequency of the cantilever 1 varies according to the physical properties of the portion of the specimen 21 in contact with the probe 20. As a result, the phase of the output signal from the band-pass filter (BPF) 11 varies. Consequently, the output voltage Vp from the phase comparator 12 varies, producing an inverted output voltage $V_E$ from the error amplifier 13. This output $V_E$ is added to the set voltage $V_0$ and applied to the voltage-controlled oscillator (VCO) 8. The output frequency of the voltage-controlled oscillator 8 varies in such a direction that the cantilever 1 restores its resonant condition. As a result of the operation for tracking the resonance frequency described thus far, the cantilever 1 vibrates at its resonant frequency at all times. These operations are automatically performed by the circuitry constructed as described above.

Under this condition, the amplitude detector 17 finds the RMS amplitude of the cantilever signal passed through the band-pass filter 11, obtains the resonance peak height Vmax, and sends a signal indicative of Vmax to the image creation means 19. This image creation means 19 converts the amplitude of the cantilever 1 into a Q factor, using the aforementioned calibration curve or sensitivity coefficient. Similarly, the frequency demodulator 18 detects the frequency of the output signal from the band-pass filter 11, and supplies a signal indicative of the found resonance frequency to the image creation means 19. As the specimen 21 is scanned, the image creation means 19 stores the resonance frequency signal and the Q factor signal in its image memory, thus obtaining a resonance frequency image and a Q factor image. These images are displayed on the viewing screen of a display means 25.

If the specimen surface is uneven, the output from the cantilever signal passed through the low-pass filter 6 varies during scanning of the image. The z-position controller 7 controls the z position of the specimen 21 such that the output signal from the low-pass filter 6 is kept constant. This z-position control signal is supplied from the z-position controller 7 to the image creation means 19. As the specimen 21 is scanned, the image creation means 19 stores the z-position control signal in its image memory. As a result, a topographic image of the specimen 21 is displayed on the viewing screen of the display means 25. The value of the load produced at this time is recorded and used for an analysis performed to evaluate the characteristics of the specimen 21 from the resonance frequency and Q factor.

The present invention yields the following advantages.

(1) Quick Measurement of Q Factor

In the prior art technique, it has been necessary to sweep the frequency to find the Q factor. Therefore, it takes a long time to measure the Q factor. In the present invention, the amplitude under a resonant condition is used and so frequency sweeping is not necessary. As a consequence, the Q factor can be measured quickly.

(2) Accurate Measurement of Q Factor

The method of judging the linearity of contact, using the symmetry of a spectrum as an index, assures that the contact between the probe and the specimen is monitored and controlled, the method being a part of the present invention. Accordingly, apparent decrease in Q factor due to distortion of the spectrum is avoided. Hence, accurate measurement of the Q factor is accomplished.

(3) Improvement of Physical Property-Evaluating Performance Owing to Comparison between Resonance Frequency and Q Factor In the prior art technique, an image indicating the distribution of resonance frequency and an image indicating the distribution of Q factor cannot be compared in detail. Therefore, it has been difficult to discover subtle variations in physical properties of the specimen, including complex variations of both resonance frequency and Q factor. According to the present invention, however, the distribution of resonance frequency and the distribution of Q factor can be imaged and compared in detail. This increases the possibility that the operator can discover a new phenomenon.

We have discovered from an image of dislocations in graphite that some dislocations close to the surface produced higher resonance frequencies and lower Q factors than non-defective portions. Normally, dislocations close to the surface show lower resonance frequencies and lower Q factors than non-defective portions. These variations are versatile in shape, and the image has not been previously viewed with any kind of microscope. In this respect, the imaging method according to the present invention is highly likely to contribute to improvements in science.

Having thus described our invention with the detail and particularity required by the Patent Laws, what is desired protected by Letters Patent is set forth in the following claims.

What is claimed is:

1. A method of observing a specimen having a surface in atomic force microscopy, said method comprising the steps of:
   preparing a cantilever to which a probe is attached;
   exciting said cantilever while said probe is in contact with a portion of the specimen surface into vibration at a resonant frequency characterized by the physical properties of the portion of the specimen surface contacted by the probe, using feedback indicative of the vibration of the cantilever with the probe in contact with the specimen surface to maintain the cantilever in resonance;
   detecting the amplitude of said cantilever in resonance; and
   finding the Q factor of said cantilever based on the found amplitude.

2. A method of observing a specimen in atomic force microcopy as set forth in claim 1, wherein said step of exciting said cantilever into vibration while said probe is kept in contact with the specimen consists of monitoring the phase of said cantilever and applying negative feedback to the vibrational frequency of the means for exciting said cantilever into vibration according to amount of variation of the monitored phase.

3. A method of observing a specimen in atomic force microscopy as set forth in claim 1 or 2, wherein one of a calibration curve indicating the relation between the amplitude of said cantilever in resonance and said Q factor and a sensitivity coefficient indicative of the ratio of the Q factor of said cantilever in resonance to the amplitude of the cantilever under this condition is previously empirically found, and wherein said Q factor is found by conversion from the detected amplitude.

4. A method of observing a specimen in atomic force microscopy as set forth in claim 3, wherein when one of said calibration curve and sensitivity coefficient is obtained, said cantilever is vibrated to produce a resonance spectrum that is symmetrical with respect to a resonant frequency, and wherein one of said calibration curve and sensitivity coefficient is obtained from the produced resonance spectrum.

5. An atomic force microscope for analysis of a specimen having a surface comprising:
   vibrating means for exciting a cantilever to which a probe is attached into vibration at a frequency characterized by the physical properties of the portion of the specimen surface contacted by the probe;
   vibration control means using feedback indicative of the vibration of the cantilever with the probe in contact with the portion of the specimen surface for controlling said vibrating means to maintain said cantilever in resonance while said probe is in contact with a specimen;
   amplitude detection means for detecting the amplitude of said cantilever in resonance; and
   means for finding the Q factor of said cantilever based on the amplitude detected by said amplitude detection means.

6. The atomic force microscope of claim 5, wherein said vibration control means monitors the phase of said cantilever and applies negative feedback to the vibrational frequency of said vibrating means for exciting said cantilever into vibration according to amount of variation of the monitored phase.

7. The atomic force microscope of claim 5 or 6, wherein said means for finding the Q factor of said cantilever converts the amplitude detected by said amplitude detection means into the Q factor using one of a calibration curve indicating the relation between the amplitude of said cantilever in resonance and said Q factor and a sensitivity coefficient indicative of the ratio of the Q factor of said cantilever in resonance to the amplitude of the cantilever.

8. A method of observing a specimen having a surface in atomic force microscopy, said method comprising the steps of:
preparing a cantilever to which a probe is attached;
exciting said cantilever into vibration at resonance, using feedback to maintain it in resonance while said probe is kept in contact with the specimen surface;
detecting the amplitude of said cantilever in resonance; and
finding the Q factor of said cantilever based on the found amplitude,
wherein said step of exciting said cantilever into vibration while said probe is kept in contact with the specimen consists of monitoring the phase of said cantilever and applying negative feedback to the vibrational frequency of the means for exciting said cantilever into vibration according to amount of variation of the monitored phase, and
wherein when one of a calibration curve and sensitivity coefficient is obtained, said cantilever is vibrated to produce a resonance spectrum that is symmetrical with respect to a resonant frequency, and wherein one of said calibration curve and sensitivity coefficient is obtained from the produced resonance spectrum.

9. A method of observing a specimen having a surface in atomic force microscopy, said method comprising the steps of:
preparing a cantilever to which a probe is attached;
exciting said cantilever into vibration at resonance, using feedback to maintain it in resonance while said probe is kept in contact with the specimen surface;
detecting the amplitude of said cantilever in resonance;
finding the Q factor of said cantilever based on the found amplitude, and
wherein load dependence of the resonant frequency of said cantilever and load dependence of said Q factor are measured.

10. The atomic force microscope of claim 9, further including means for detecting frequency of said cantilever in resonance and displaying an image regarding the resonant frequency and an image regarding said Q factor such that both images can be compared.

11. A method of observing a specimen having a surface in atomic force microscopy, said method comprising the steps of:
preparing a cantilever to which a probe is attached;
exciting said cantilever into vibration at resonance, using feedback to maintain it in resonance while said probe is kept in contact with the specimen surface;
detecting the amplitude of said cantilever in resonance; and
finding the Q factor of said cantilever based on the found amplitude,
wherein one of said probe and specimen is scanned relative to the other, and wherein an image regarding said Q factor is displayed.

12. An atomic force microscope comprising:
vibrating means for exciting a cantilever to which a probe is attached into vibration;
vibration control means using feedback for controlling said vibrating means to maintain said cantilever in resonance while said probe is in contact with a specimen;
amplitude detection means for detecting the amplitude of said cantilever in resonance; and
means for finding the Q factor of said cantilever based on the amplitude detected by said amplitude detection means,
wherein one of said probe and specimen is scanned relative to the other, and wherein an image regarding said Q factor is displayed.

13. A method of observing a specimen in atomic force microscopy as set forth in claim 12, wherein frequency of said cantilever in resonance is detected, and wherein an image regarding the resonant frequency and an image regarding said Q factor are displayed such that both images can be compared.

* * * * *